United States Patent
Hong (10) Patent No.: US 7,990,498 B2
(45) Date of Patent: Aug. 2, 2011

(54) MULTI-VIEW DISPLAY DEVICE HAVING PARTICULAR COLOR FILTER ARRAYS

(75) Inventor: Hyung Ki Hong, Seoul (KR)

(73) Assignee: LG Display Co., Ltd., Seoul (KR)

( * ) Notice: Subject to any disclaimer, the term of this patent is extended or adjusted under 35 U.S.C. 154(b) by 233 days.

(21) Appl. No.: 12/485,504

(22) Filed: Jun. 16, 2009

(65) Prior Publication Data
US 2010/0085517 A1    Apr. 8, 2010

(30) Foreign Application Priority Data

Oct. 7, 2008  (KR) .................. 10-2008-0097993

(51) Int. Cl.
G02F 1/1335  (2006.01)
(52) U.S. Cl. .................. 349/106; 349/108; 349/109
(58) Field of Classification Search .................. 349/106, 349/108, 109
See application file for complete search history.

(56) References Cited

U.S. PATENT DOCUMENTS

| | | | |
|---|---|---|---|
| 7,425,951 B2 * | 9/2008 | Fukushima et al. | 345/419 |
| 2007/0018585 A1 * | 1/2007 | Ijzerman et al. | 315/15 |
| 2009/0115800 A1 * | 5/2009 | Berretty et al. | 345/690 |
| 2009/0147178 A1 * | 6/2009 | Ahn et al. | 349/62 |

* cited by examiner

Primary Examiner — Mike Qi
(74) Attorney, Agent, or Firm — Morgan, Lewis & Bockius LLP (57) ABSTRACT

A multi-view image display device adapted to display images different from each other using one screen of a display panel is disclosed. The multi-view image display device includes a display panel inclusive of a first color filter array having a first red sub-pixel, a first green sub-pixel and a first blue sub-pixel that constitute a first image, and a second red sub-pixel, a second green sub-pixel and a second blue sub-pixel that constitute a second image; and a color filter barrier substrate inclusive of a second color filter array that is separated from the display panel with a fixed distance and has red, green and blue color filters. The red color filter of the second color filter array corresponds to the first blue sub-pixel and the second green sub-pixel of the first color filter array. The green color filter of the second color filter array corresponds to the first red sub-pixel and the second blue sub-pixel of the first color filter array. The blue color filter of the second color filter array corresponds to the first green sub-pixel and the second red-sub-pixel of the first color filter array.

8 Claims, 10 Drawing Sheets

MULTI-VIEW DISPLAY DEVICE HAVING PARTICULAR COLOR FILTER ARRAYS

CROSS-REFERENCE TO RELATED APPLICATION

This application claims priority under 35 U.S.C. 119 to Korean Patent Application No. 10-2008-97993, filed on Oct. 7, 2008, which is hereby incorporated by reference in its entirety.

BACKGROUND

1. Field of the Disclosure

This disclosure relates to an image display device, and more particularly to a multi-view image display device.

2. Description of the Related Art

An image display device that displays an image includes a display panel in which the image is directly displayed and a driver that drives the display panel, and a plurality of pixels of two dimensional matrix shape are formed in the image display panel. The image display device synthesizes unit image signals which are displayed in each pixel to display a screen.

On the other hand, an image display device that includes a barrier or lenticular lens by location between the display panel and a user and where pixels visible between the barriers are different in accordance with a viewing angle has also been introduced. In such an image display device, the pixel displaying an image is changed in accordance with the viewing angle, and viewing zones different from each other are formed in accordance with the viewing angle. That is to say, the pixels contributing to different viewing zone are different from others, and video signals different from each other was displayed with these pixels, thus different image is displayed at the different viewing zone. Such an image display device is a multi-view image display device.

Figure 1:
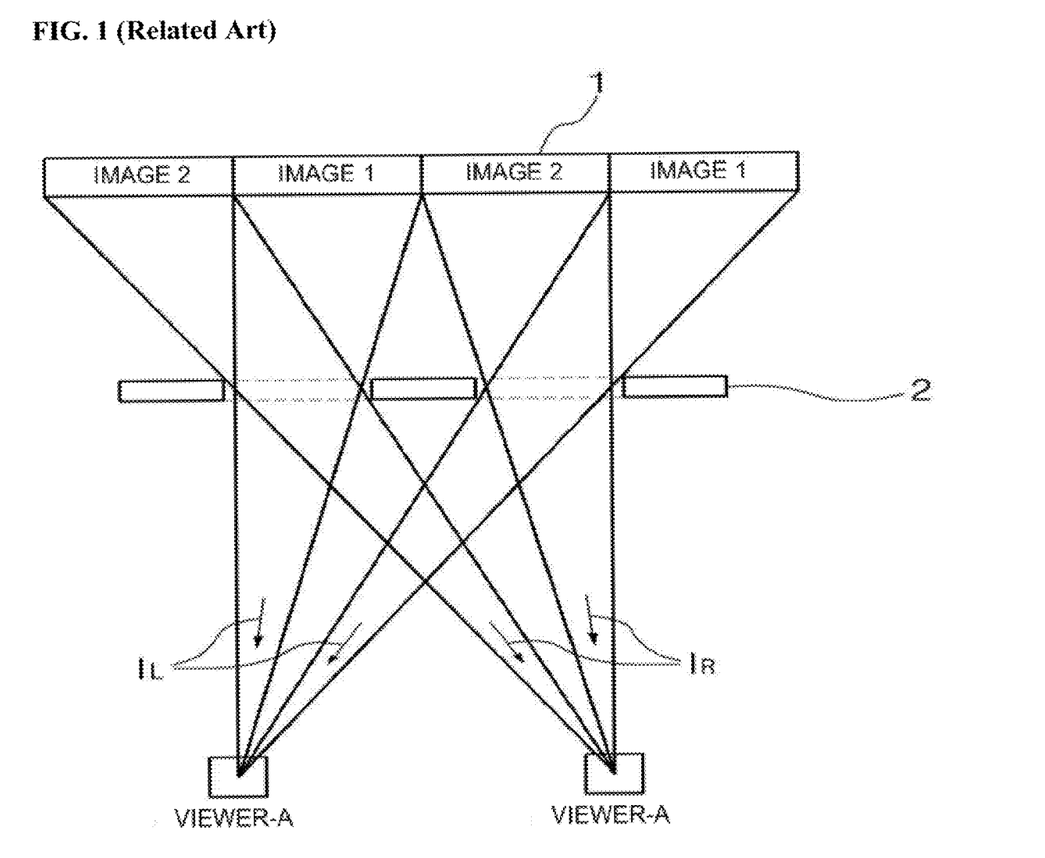
FIG. 1 is a diagram explaining a principle of a dual view image display device among a multi-view image display device of related art.

FIG. 1 is a view for explaining a principle of a dual view image display device among multi-view image display devices according to the related art. It is shown that Viewer-A and Viewer-B located in different viewing zones see Image-1 and Image-2, which are simultaneously displayed in a display panel 1, as images, which are separated from each other, through a light shielding pattern 2. That is to say, Viewer-A takes only Image-1 by the light shielding pattern 2 and Viewer-B takes only Image-2 by the light shielding pattern 2, thus each viewer sees an image different from the other.

However, when implementing the multi-view image display device as above, if the light shielding pattern is used, the brightness distribution of the display panel is inferior to the light brightness distribution made by a light source located at the rear surface of the display panel, thus there is a problem in that the transmittance of the display panel decreases.

Further, when implementing the multi-view image display device, if the light shielding pattern is used, there is a problem in that a color change of the display panel is generated in the different location of each of Viewer-A and Viewer-B.

BRIEF SUMMARY

Accordingly, the present embodiments are directed to a multi-view image display device that substantially obviates one or more of problems due to the limitations and disadvantages of the related art.

An object of the present embodiment is to provide a multi-view image display device that can display images different from each other without interference at side locations different from each other through one screen of a display panel.

Another object of the present embodiment is to provide a multi-view image display device that can increase transmittance.

Still another object of the present embodiment is to provide a multi-view image display device that prevents colors from being changed.

Additional features and advantages of the embodiments will be set forth in the description which follows, and in part will be apparent from the description, or may be learned by practice of the embodiments. The advantages of the embodiments will be realized and attained by the structure particularly pointed out in the written description and claims hereof as well as the appended drawings.

According to one general aspect of the present embodiment, a multi-view image display device includes: a display panel inclusive of a first color filter array having a first red sub-pixel, a first green sub-pixel and a first blue sub-pixel that constitute a first image, and a second red sub-pixel, a second green sub-pixel and a second blue sub-pixel that constitute a second image; and a color filter barrier substrate inclusive of a second color filter array that is separated from the display panel with a fixed distance and has red, green and blue color filters, and the red color filter of the second color filter array corresponds to the first blue sub-pixel and the second green sub-pixel of the first color filter array, the green color filter of the second color filter array corresponds to the first red sub-pixel and the second blue sub-pixel of the first color filter array, and the blue color filter of the second color filter array corresponds to the first green sub-pixel and the second red-sub-pixel of the first color filter array.

The width of one sub-pixel constituting the first color filter array is half the width of one sub-pixel that constitutes the second color filter array.

The display panel is a liquid crystal display panel, and the liquid crystal display panel has an upper substrate where the first color filter array is formed, a lower substrate where a thin film transistor array is formed, and a liquid crystal layer formed between the upper substrate and the lower substrate.

A multi-view image display device according to another aspect of the present embodiment includes: a display panel inclusive of a first color filter array having a first red sub-pixel, a first green sub-pixel and a first blue sub-pixel that constitute a first image, a second red sub-pixel, a second green sub-pixel and a second blue sub-pixel that constitute a second image, a third red sub-pixel, a third green sub-pixel and a third blue sub-pixel that constitute a third image, and a fourth red sub-pixel, a fourth green sub-pixel and a fourth blue sub-pixel that constitute a fourth image; and a color filter barrier substrate inclusive of a second color filter array that is separated from the display panel with a fixed distance and has red, green and blue color filters and a light shielding pattern that is formed between the color filters, and the red color filter of the second color filter array has the central area thereof correspond to the first green sub-pixel and the fourth blue sub-pixel of the first color filter array and the edge area thereof correspond to half of each of the second and third red sub-pixels of the first color filter array, the green color filter of the second color filter array has the central area thereof correspond to the first blue sub-pixel and the fourth red sub-pixel of the first color filter array and the edge area thereof correspond to half of each of the second and third green sub-pixels of the first color filter array, and the blue color filter of the second color filter array has the central area thereof correspond to the first red sub-pixel and the fourth green sub-pixel of the first color filter array and the edge area thereof correspond to half of each of the second and third blue sub-pixels of the first color filter array.

The light shielding pattern between the red color filter and the blue color filter of the second color filter array corresponds to half of each of the second red sub-pixel and third blue sub-pixel of the first color filter array, the light shielding pattern between the red color filter and the green color filter of the second color filter array corresponds to half of each of the third red sub-pixel and second green sub-pixel of the first color filter array, and the light shielding pattern between the green color filter and the blue color filter of the second color filter array corresponds to half of each of the third green sub-pixel and second blue sub-pixel of the first color filter array.

The width of one sub-pixel constituting the first color filter array is ⅓ of the width of one sub-pixel constituting the second color filter array.

The width of the light shielding pattern is double the width of one sub-pixel constituting the first color filter array.

The display panel is a liquid crystal display panel, and the liquid crystal display panel has an upper substrate where the first color filter array is formed, a lower substrate where a thin film transistor array is formed, and a liquid crystal layer formed between the upper substrate and the lower substrate.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims. Nothing in this section should be taken as a limitation on those claims. Further aspects and advantages are discussed below in conjunction with the embodiments. It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the embodiments and are incorporated in and constitute a part of this application, illustrate embodiment(s) of the invention and together with the description serve to explain the disclosure. In the drawings.

DETAILED DESCRIPTION

Reference will now be made in detail to the embodiments of the present disclosure, examples of which are illustrated in the accompanying drawings. These embodiments introduced hereinafter are provided as examples in order to convey their spirits to the ordinary skilled person in the art. Therefore, these embodiments might be embodied in a different shape, so are not limited to these embodiments described here. Also, the size and thickness of the device might be expressed to be exaggerated for the sake of convenience in the drawings. Wherever possible, the same reference numbers will be used throughout this disclosure including the drawings to refer to the same or like parts.

FIGS. 2A to 7 are views illustrating a dual view image display device that displays different images from each other from both sides according to a first embodiment of the present invention. Also, when explaining embodiments according to the present invention as below, a liquid crystal display device is taken as an example among image display devices. And, the image display device can be a plasma display panel (PDP) using the discharge of inert gas, an organic electro luminous display (OLED), and etc. except the liquid crystal display device.

Figure 2A:
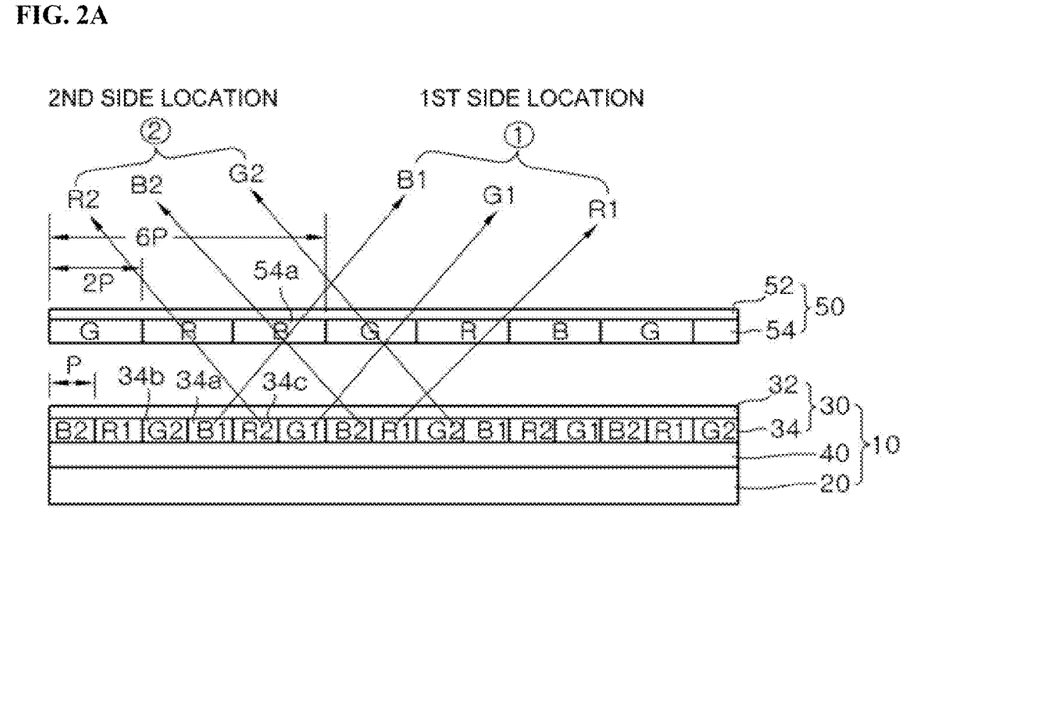
FIGS. 2A and 2B are diagrams showing a multi-view image display device according to an embodiment of the present disclosure.
Figure 2B:
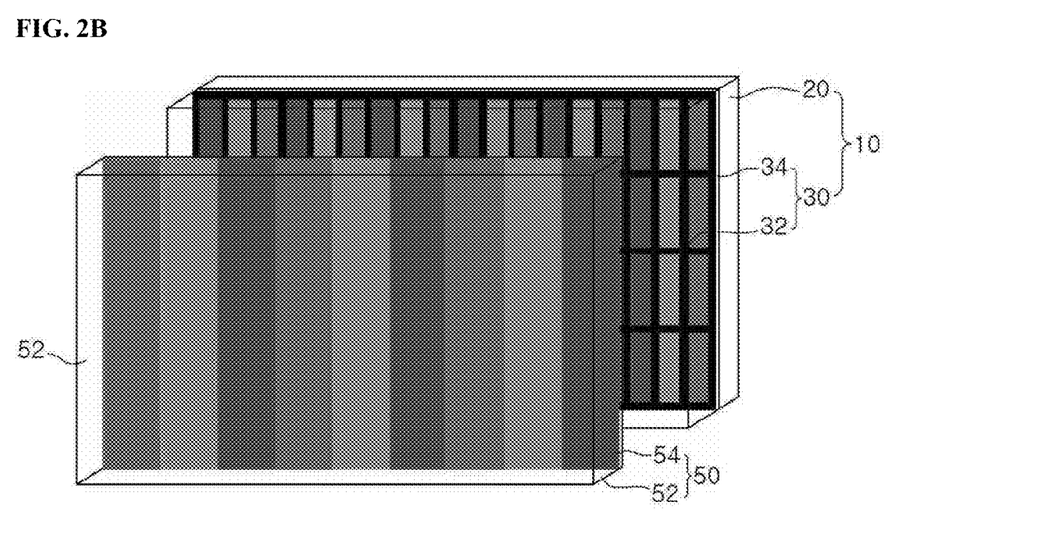

As shown in FIGS. 2A and 2B, a dual view liquid crystal display device according to the present invention includes a liquid crystal display panel 10, and a color filter barrier substrate 50 separated from the liquid crystal display panel 10 with a designated distance.

The liquid crystal display panel 10 includes a lower substrate 20 inclusive of a thin film transistor array, an upper substrate 30 inclusive of a first color filter array 34, and a liquid crystal layer 40 formed between the lower substrate 20 and the upper substrate 30.

And, though not shown, the image display device includes a backlight unit for supplying light from the rear surface of the liquid crystal display panel because the liquid crystal display panel is a non-luminous device.

The thin film transistor array includes gate lines and data lines that cross each other to be insulated on a substrate (not shown), thin film transistors of which each is connected to the data line and the data line and drives a sub-pixel separately, and pixel electrodes that are formed dividedly at each sub-pixel area and of which each is connected to the thin film transistor. Further, the thin film transistor array includes a common electrode that forms an electric field with the pixel electrode to drive the liquid crystal layer 40.

A first color filter array 34 is formed on a substrate 32 and includes a color filter formed in red R, green G and blue B at each sub-pixel area. At this moment, the first color filter array 34 includes sub-pixels R1, B1, G1 constituting a first image and sub-pixels R2, B2, G2 constituting a second image which are alternately disposed. The width of on sub-pixel width is defined to be one pitch. Further, a black matrix (not shown) dividing each sub-pixel area is further disposed between the first color filter array 34 and the substrate 32, and if no common electrode is formed in the lower substrate 20, a common electrode might be formed on the first color filter array 34.

A color filter barrier substrate 50 has a second color filter array 54 that is formed on the substrate 52. The second color filter array 54 includes a color filter formed in red R, green G and blue B at each sub-pixel area.

And, a sub-pixel B1 of the color filter array 34 corresponds to a sub-pixel G2 thereof in the red R color filter which constituting the second color filter array 54, a sub-pixel RI of the first color filter array 34 corresponds to a sub-pixel B2 thereof in the green G color filter, and a sub-pixel G1 of the color filter array 34 corresponds to a sub-pixel R2 thereof in the blue B color filter. And, the one sub-pixel area of the second color filter array 54 is defined to be two pitches because it corresponds to two sub-pixel area of the first color filter array, and one pixel area of the second color filter array s defined to be six pitches, and the second color filter array is repeated in a cycle of six pitches.

Accordingly, the two sub-pixels of the first color filter array 34 is made to correspond to one sub-pixel of the second color filter array 54 to have different colors from each other, and at the same time, different images from each other are alternately input to the sub-pixels of the first color filter array, thus a first image R1, G1, B1 can be seen at the first side location and a second image R2, G2, B2 can be seen at the second side location.

For example, at the first side location, if the blue B color filter 54a of the sub-pixel area of the second color filter array has the same color as the sub-pixel B1 34a of the first color filter array 34 to which light is incident, the light from the sub-pixel B1 34a is transmitted to make the image of the sub-pixel B1 of the first color filter array visible, and if the sub-pixels G2 34b, R2 34c adjacent to the sub-pixel B1 34a do not have the same color as the blue B color filter 54a of the second color filter array, the light from the sub-pixels G2 34b, R2 34c is intercepted to make the image of the sub-pixels G2, R2 of the first color filter array invisible. In the same manner, the image of the sub-pixels G1, R1 of the first color filter array is visible at the first side location, and the image of the sub-pixels G2, R2, B2 of the first color filter array is visible at the second side location.

Figure 7:
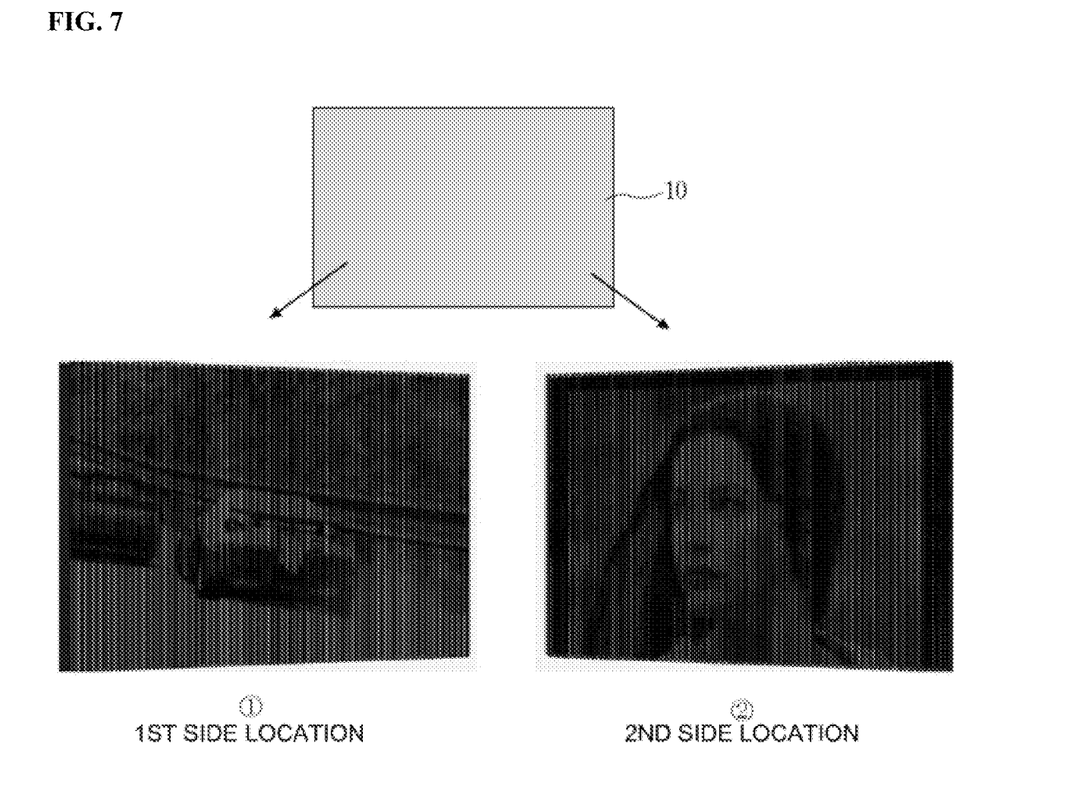
FIG. 7 is a view illustrating different image from each other which are displayed by a dual view image display device of the present disclosure.

Accordingly, the first image R1, G1, B1 can be seen at the first side location and the second image R2, G2, B2 can be seen at the second side location, thus different images from each other can respectively be seen at the first side location and the second side location which are different from each other, as shown in FIG. 7.

Further, when different images from each other are respectively seen from the first side location and the second side location, a phenomenon that different image from each other are overlapped at each location, i.e., a cross talk phenomenon, is prevented.

Figure 3:
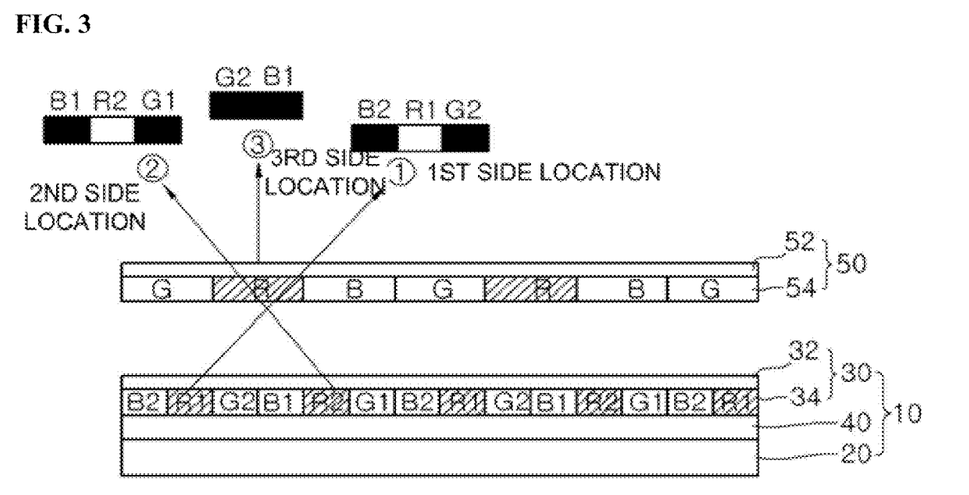
FIG. 3 is a diagram explaining a dual view image display device according to a first embodiment of the present disclosure.

For example, as shown in FIG. 3, at the first side location, if the red R color filter of the second color filter array has the same color as the sub-pixel R1 of the first color filter array 34 to which light is incident, the light from the sub-pixel R1 is transmitted to make the image of the sub-pixel R1 of the first color filter array visible, but if the sub-pixels G2, B2 adjacent to the sub-pixel R1 do not have the same color as the red R color filter of the second color filter array, the light from the sub-pixels G2 B2 is intercepted to make the image of the sub-pixels G2, B2 of the first color filter array invisible, thus when the different images from each other are respectively seen at the first side location and the second side location, a phenomenon that different image from each other are overlapped at each location, i.e., a cross talk phenomenon, is prevented.

And, at the front side location, the sub-pixels G2, B1 of the first color filter array 34 does not have the same color as the red R color filter of the second color filter array, thus the light from the sub-pixels G2, B1 of the first color filter array 34 are intercepted to make the image of the sub-pixels G2, B1 of the first color filter array invisible. Therefore, when the different images from each other are respectively seen at the first side location and the second side location, a phenomenon that different image from each other are overlapped at each location is prevented because no image can be seen at the front side location.

Figure 4A:
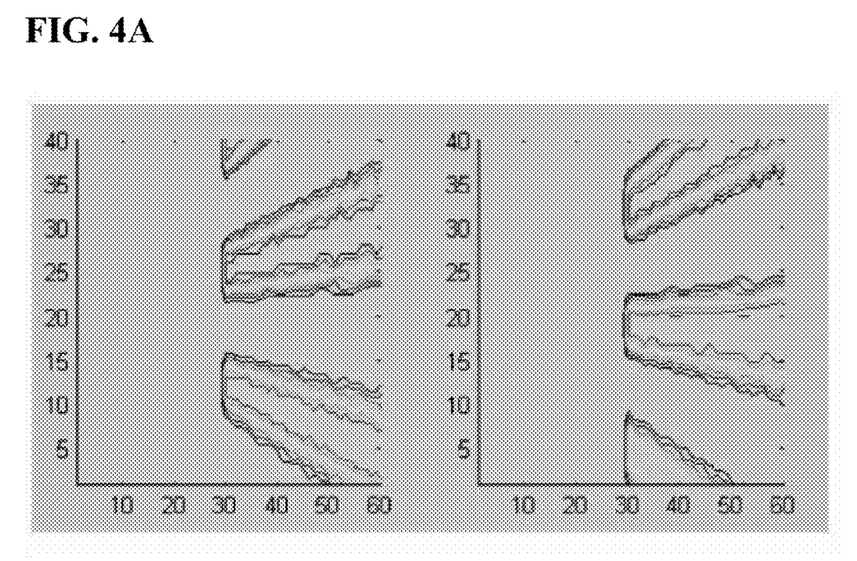
FIGS. 4A and 4B are diagrams comparing the transmittance of the related art and the transmittance of the present disclosure.
Figure 4B:
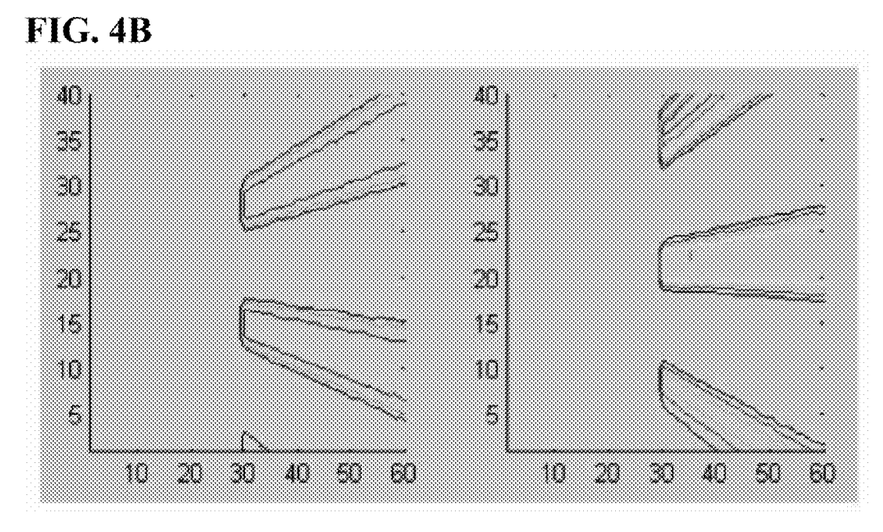

Further, when comparing FIG. 4A illustrating the transmittance of the related art using an array substrate where a light shielding pattern is formed with FIG. 4B illustrating the transmittance of the present invention using the first and second color filter arrays, the transmittance of the related art is around 15-20% and the transmittance of the present invention is around 33%, thus the transmittance of the present invention increases to be higher than the transmittance of the related art.

Further, because the proportion of area of the sub-pixel of the first color filter seen through the second color filter array is always identical in accordance with the location of a user, it is possible to prevent the color change problem generated at each location.

Figure 5A:
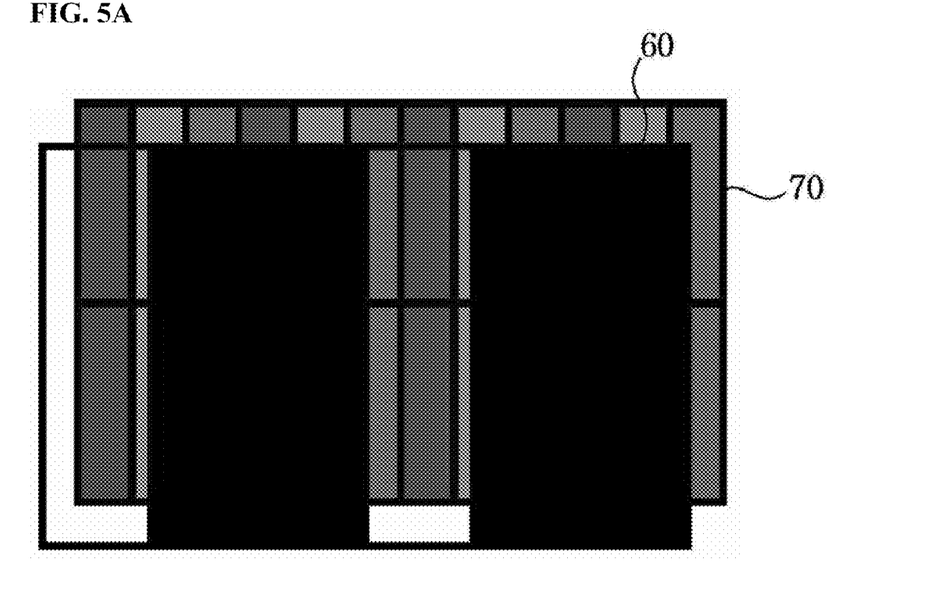
FIGS. 5A and 5B are diagrams explaining the color change of the image display device of the related art.
Figure 5B:
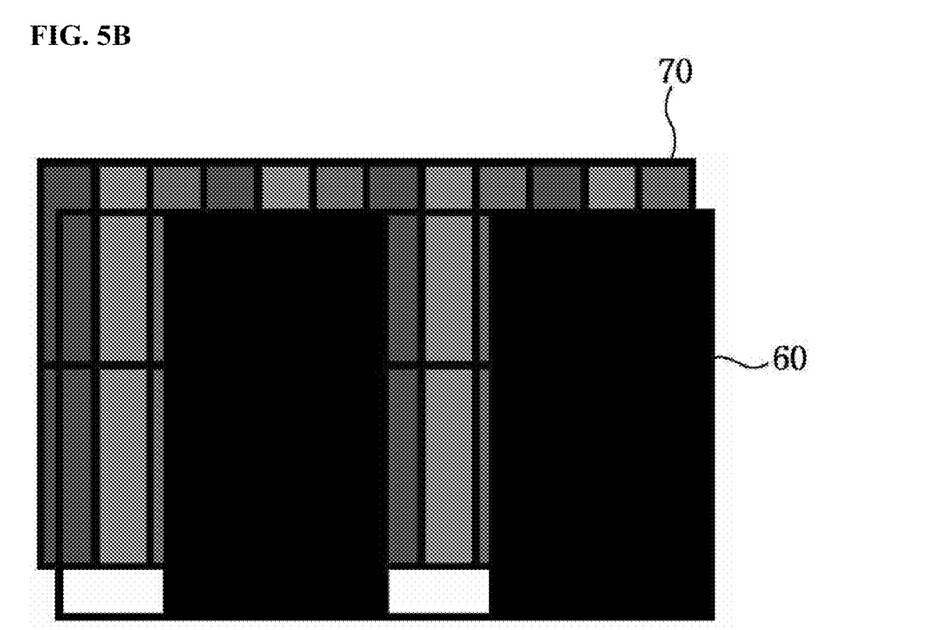
Figure 6A:
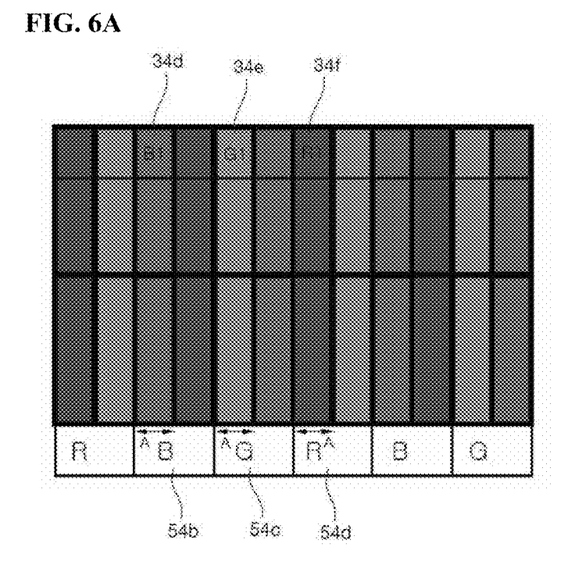
FIGS. 6A and 6B are diagrams explaining the color change of the image display device according to the present disclosure.
Figure 6B:
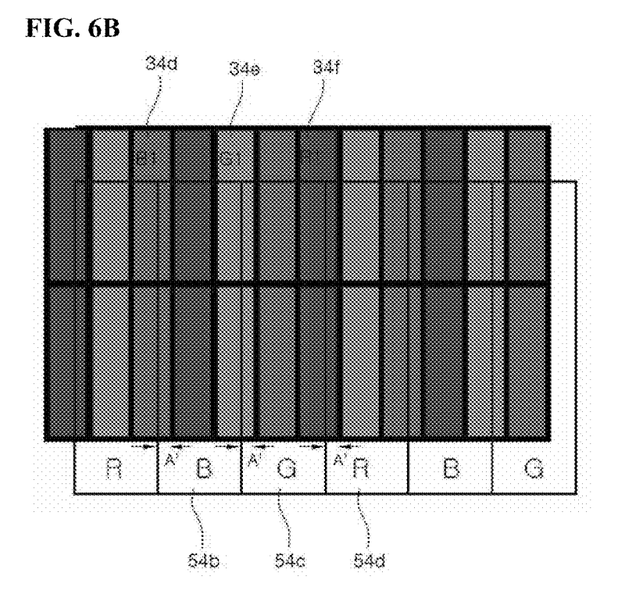

In the related art, the color change problem is generated because the array substrate where the light shielding substrate is formed is used. That is to say, as shown in FIG. 5A, if the array substrate 60 where the light shielding pattern is formed is disposed on the color filter array 70, the red color of the color filter array is highlighted when the user is at a designated location, and as shown in FIG. 5B, if the user is at another location, blue color is highlighted, thus the color change problem is generated at different locations of the user. However, if the first and second color filter arrays are used as in the present invention, the color change problem can be prevented. That is to say, as shown in FIG. 6A, when the user is at the designated location, the area proportion of the sub-pixels B1 34d, G1 34e, R1 34f of the first color filter array seen through the sub-pixels B 54b, G 54c, R 54d of the second color filter array is always the same as "A" and, as shown in FIG. 6B, when the user is at the other location, the area proportion of the sub-pixels B1 34d, G1 34e, R1 34f of the first color filter array seen through the sub-pixels B 54b, G 54c, R 54d of the second color filter array is always the same as "A'", thus the color change problem generated at each location, i.e., a phenomenon that the area proportion of a fixed color increases to highlight the color, can be prevented.

Sequentially, a fourfold-view image display device that displays different images from each other in four directions will be explained according to a second embodiment of the present invention.

Figure 8:
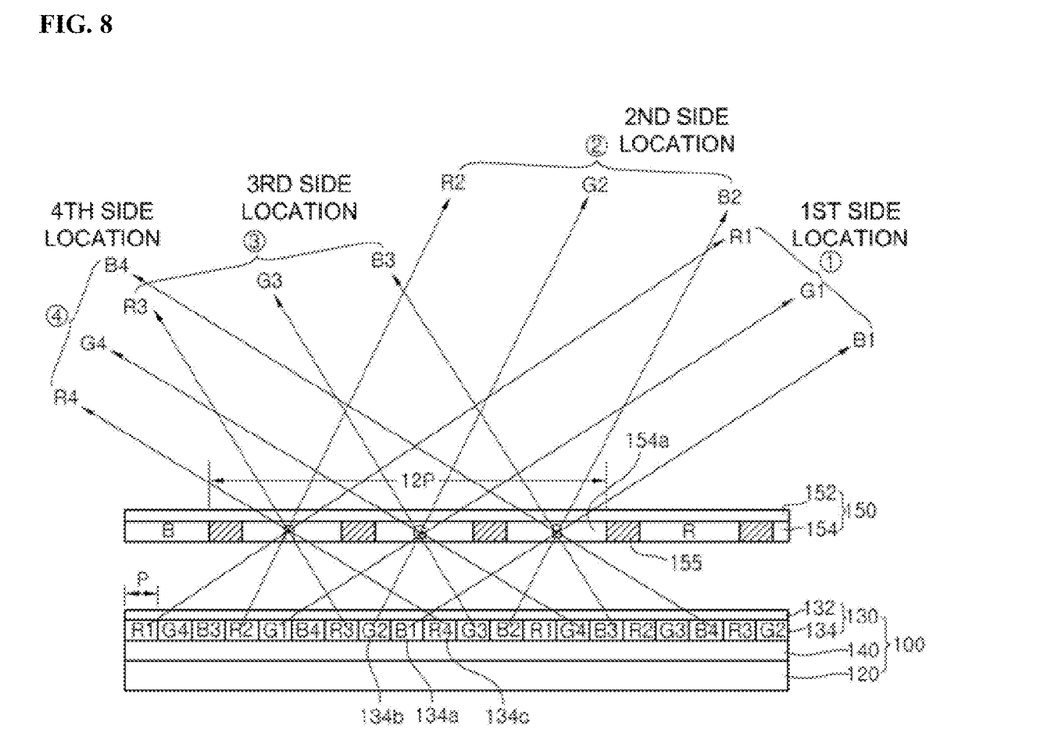
FIG. 8 is a view illustrating a fourfold-view image display device according to a second embodiment of the present disclosure.
Figure 9A:
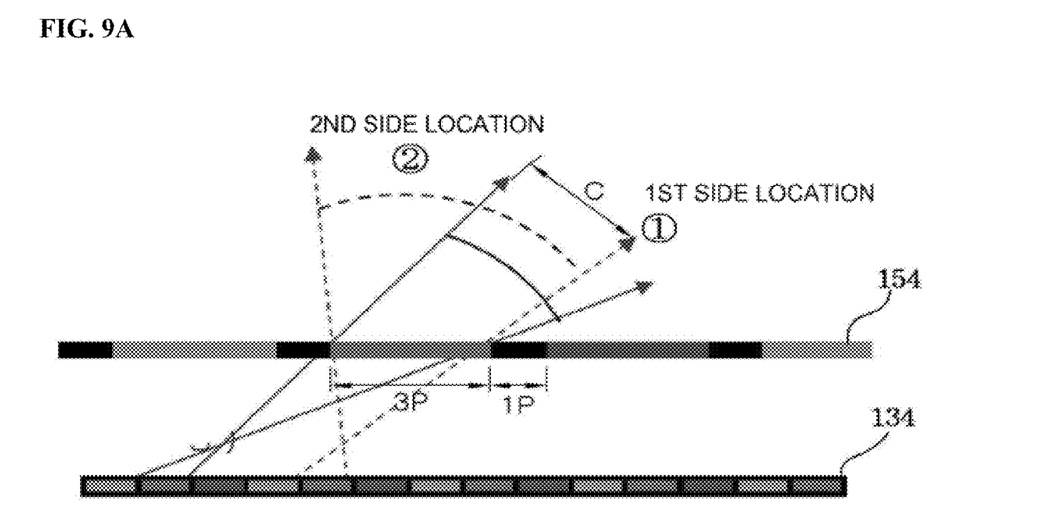
FIGS. 9A and 9B are diagrams explaining a cross-talk of the fourfold-view image display device according to the second embodiment of the present disclosure.
Figure 9B:
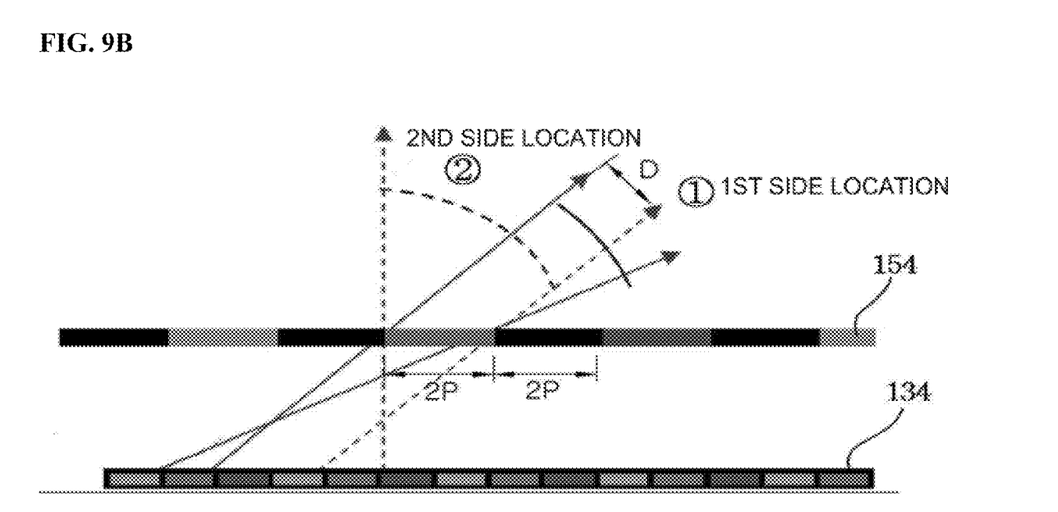
Figure 10:
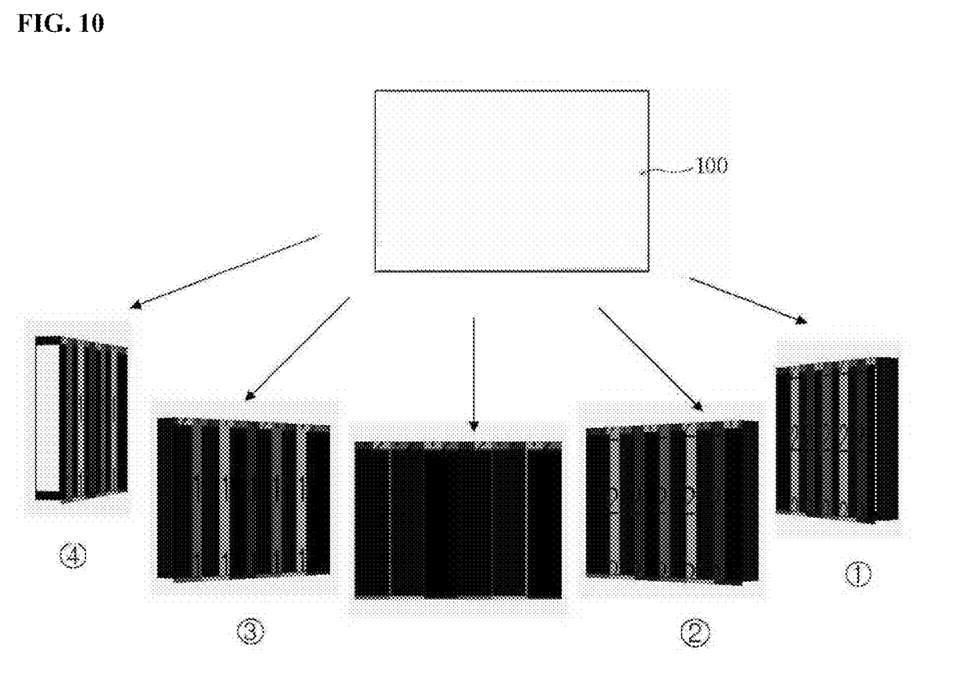
FIG. 10 is a view illustrating different images from each other which are displayed by a fourfold-view image display device of the present disclosure.

FIGS. 8 to 10 are view illustrating the fourfold-view image display device that displays the images different from each other in the four directions according to the second embodiment of the present invention.

As shown in FIG. 8, a fourfold-view liquid crystal display device being the fourfold-view image display device according to the present invention includes a liquid crystal display panel 100 and a color barrier substrate 150 that is separated from the liquid crystal display panel 100 with a fixed distance.

The liquid crystal display panel 100 includes a lower substrate 120 inclusive of a thin film transistor array, an upper substrate 130 inclusive of the first color filter array 134, and a liquid crystal layer 140 formed between the lower substrate 120 and the upper substrate 130.

And, though not shown, the image display device includes a backlight unit for supplying light from the rear surface of the liquid crystal display panel because the liquid crystal panel is non-luminous device.

The thin film transistor array as the same structure as the thin film transistor array disclosed in the first embodiment, thus the explanation thereto will be omitted.

The first color filter array 134 is formed on the substrate 132 and includes the color filter formed in red R, green G, blue B at each sub-pixel area. On the other hand, the first color filter array 134 includes sub-pixels R1, B1, G1 constituting a first image, sub-pixels R2, B2, G2 constituting a second image, sub-pixels R3, B3, G3 constituting a third image, and sub-pixels R4, B4, G4 constituting a fourth image which are alternately disposed. And, one sub-pixel width is defined to be one pitch. Further, a first black matrix (not shown) dividing each sub-pixel area is further disposed between the first color filter array 134 and the substrate 132, and if a common electrode is not formed in the lower substrate 120, a common electrode might be formed on the first color filter array 134.

A color filter barrier substrate 150 includes a second color filter array 154 on the substrate 152, and the second color filter array 154 includes the color filter formed in red R, green G and blue B at each sub-pixel area, and a light shielding pattern 155 is disposed between the color filters.

And, in the red R color filter constituting the second color filter array 154, the sub-pixels G1 and B4 of the first color filter array 134 corresponds to the central area, half of each of the sub-pixels R2, R3 of the first color filter array 134 corresponds to the edge area. In the green G color filter, the sub-pixels B1 and R4 of the first color filter array 134 corresponds to the central area, half of each of the sub-pixels G2, G3 of the first color filter array 134 corresponds to the edge area. In the blue B color filter, the sub-pixels R1 and G4 of the first color filter array 134 corresponds to the central area, half of each of the sub-pixels B2, B3 of the first color filter array 134 corresponds to the edge area. And, half of each of the sub-pixels R2, B3 of the first color filter array 134 corresponds to the light shielding pattern 155 between the red R color filter and blue B color filter that constitute the second color filter array 154, half of each of the sub-pixels R3, G2 of the first color filter array 134 corresponds to the light shielding pattern 155 between the red R color filter and green G color filter that constitute the second color filter array 154, and half of each of the sub-pixels G3, B2 of the first color filter array 134 corresponds to the light shielding pattern 155 between the green G color filter and blue B color filter that constitute the second color filter array 154.

And, one sub-pixel area of the second color filter array 154 is defined to be three pitches because it corresponds to three sub-pixel areas of the first color filter array, and one pixel area of the second color filter array is defined to be twelve pitches, thus the second color filter array is repeated in a circle of twelve pitches.

In this way, through two sub-pixels of the first color filter array is made to correspond to the central area of the sub-pixel of the second color filter array, they are made to have different color from each other. Though half of each sub-pixel of the first color filter array is made to correspond to the edge area of the sub-pixel of the second color filter array, they are made to have the same color. Thus, the first image R1, G1, B1 can be seen at the first side location, the second image R2, G2, B2 can be seen at the second side location, the third image R3, G3, B3 can be seen at the third side location, and the fourth image R4, G4, B4 can be seen at the fourth side location.

For example, at the first side location, if the sub-pixel B1 134a of the first color filter array 134 to which light is incident has the same color as the blue B color filter 154a of the sub-pixel area of the second color filter array, the light from the sub-pixel B1 134a is transmitted to make the image of the sub-pixel B1 of the first color filter array visible, and if the sub-pixels G2 134b, R4 134c adjacent to the sub-pixel B1 134a do not have the same color as the blue B color filter 154a of the second color filter, the light from the sub-pixels G2 134b, R4 134c is intercepted to make the image of the sub-pixels G2, R4 of the first color filter array invisible.

In the same manner, the image of the sub-pixels G1, R1 of the first color filter array can be seen at the first side location, the image of the sub-pixels G2, R2, B2 of the first color filter array can be seen at the second side location, the image of the sub-pixels G3, R3, B3 of the first color filter array can be seen at the third side location, and the image of the sub-pixels R4, G4, B4 of the first color filter array can be seen at the fourth side location.

Accordingly, the first image R1, G1, B1 can be seen at the first side location, the second image R2, G2, B2 can be seen at the second side location, the third image R3, G3, B3 can be seen at the third side location, and the fourth image R4, G4, B4 can be seen at the fourth side location. Thus, different images from each other can respectively be seen at the first, second, third and fourth side locations, as shown in FIG. 10.

Further, the light shielding pattern 155 is formed between the sub-pixels of the second color filter array, thus when the different images from each other are respectively seen from each of the different locations, the phenomenon that different images from each other are overlapped at each location, i.e., a cross talk phenomenon, can be prevented.

At this moment, if the width of the light shielding pattern is not less than two pitches, the cross talk phenomenon is not generated.

For example, as shown in FIG. 9A, if the width of the light shielding pattern formed at the second color filter array 154 is one pitch and the width of the color filter is three pitches, the overlapping area C between an area where the first image is only visible at the first side location and an area where a second image is only visible at the second side location increases to generate a cross talk phenomenon, but as shown in FIG. 9B, if the width of the light shielding pattern formed at the second color filter array 154 is two pitches and the width of the color filter is two pitches, the overlapping area D between an area where the first image is only visible at the first side location and an area where a second image is only visible at the second side location decreases so as not to generate the cross talk phenomenon. Accordingly, if the width of the light shielding pattern is not less than two pitches, no cross talk phenomenon is generated. At this moment, if the width of the light shielding pattern is higher than two pitches, the transmittance of the liquid crystal display panel might decrease, thus if the width of the light shielding pattern of two pitches is selected, then no cross talk phenomenon is generated and it is also possible to prevent the decrease of transmittance of the liquid crystal display panel.

On the other hand, the light shielding pattern 155 might be formed by overlapping each color filter when forming the color filter of the second color filter array or by using a separate black resin.

As described above, the multi-view liquid crystal display device according to an embodiment of the present disclosure have an effect that the different images from each other can be seen from different side locations from each other.

Further, the multi-view liquid crystal display device according to the present invention might prevent the color change problem, which is generated at each location, because the area proportion of the sub-pixel of the first color filter array seen through the second color filter is always the same in accordance with the location of the user.

Further, the multi-view liquid crystal display device according to the present invention might prevent the phenomenon that the different images from each other appear to be overlapped at each location, i.e., the cross talk phenomenon.

Further, the multi-view image display device according to the present disclosure has an effect that the transmittance increases.

Although the present disclosure has been limitedly explained regarding only the embodiments described above, it should be understood by the ordinary skilled person in the art that the present disclosure is not limited to these embodiments, but rather that various changes or modifications thereof are possible without departing from the spirit of the present disclosure. Accordingly, the scope of the present disclosure shall be determined only by the appended claims and their equivalents.

What is claimed is:

1. A multi-view image display device comprising:
   a display panel inclusive of a first color filter array having a first red sub-pixel, a first green sub-pixel and a first blue sub-pixel that constitute a first image, and a second red sub-pixel, a second green sub-pixel and a second blue sub-pixel that constitute a second image; and
   a color filter barrier substrate inclusive of a second color filter array that is separated from the display panel with a fixed distance and has red, green and blue color filters,
   wherein the red color filter of the second color filter array corresponds to the first blue sub-pixel and the second green sub-pixel of the first color filter array, the green color filter of the second color filter array corresponds to the first red sub-pixel and the second blue sub-pixel of the first color filter array, and the blue color filter of the second color filter array corresponds to the first green sub-pixel and the second red-sub-pixel of the first color filter array.

2. The multi-view image display device claimed as claim 1, wherein the width of one sub-pixel constituting the first color filter array is half the width of one sub-pixel that constitutes the second color filter array.

3. The multi-view image display device claimed as claim 1, wherein the display panel is a liquid crystal display panel, and the liquid crystal display panel has an upper substrate where the first color filter array is formed, a lower substrate where a thin film transistor array is formed, and a liquid crystal layer formed between the upper substrate and the lower substrate.

4. A multi-view image display device comprising:
   a display panel inclusive of a first color filter array having a first red sub-pixel, a first green sub-pixel and a first blue sub-pixel that constitute a first image, a second red sub-pixel, a second green sub-pixel and a second blue sub-pixel that constitute a second image, a third red sub-pixel, a third green sub-pixel and a third blue sub-pixel that constitute a third image, and a fourth red sub-pixel, a fourth green sub-pixel and a fourth blue sub-pixel that constitute a fourth image; and
   a color filter barrier substrate inclusive of a second color filter array that is separated from the display panel with a fixed distance and has red, green and blue color filters and a light shielding pattern that is formed between the color filters,
   wherein the red color filter of the second color filter array has the central area thereof correspond to the first green sub-pixel and the fourth blue sub-pixel of the first color filter array and the edge area thereof correspond to half of each of the second and third red sub-pixels of the first color filter array, the green color filter of the second color filter array has the central area thereof correspond to the first blue sub-pixel and the fourth red sub-pixel of the first color filter array and the edge area thereof correspond to half of each of the second and third green sub-pixels of the first color filter array, and the blue color filter of the second color filter array has the central area thereof correspond to the first red sub-pixel and the fourth green sub-pixel of the first color filter array and the edge area thereof correspond to half of each of the second and third blue sub-pixels of the first color filter array.

5. The multi-view image display device claimed as claim 4, wherein the light shielding pattern between the red color filter and the blue color filter of the second color filter array corresponds to half of each of the second red sub-pixel and third blue sub-pixel of the first color filter array, the light shielding pattern between the red color filter and the green color filter of the second color filter array corresponds to half of each of the third red sub-pixel and second green sub-pixel of the first color filter array, and the light shielding pattern between the green color filter and the blue color filter of the second color filter array corresponds to half of each of the third green sub-pixel and second blue sub-pixel of the first color filter array.

6. The multi-view image display device claimed as claim 4, wherein the width of one sub-pixel constituting the first color filter array is ⅓ of the width of one sub-pixel constituting the second color filter array.

7. The multi-view image display device claimed as claim 4, wherein the width of the light shielding pattern is double the width of one sub-pixel constituting the first color filter array.

8. The multi-view image display device claimed as claim 4, wherein the display panel is a liquid crystal display panel, and the liquid crystal display panel has an upper substrate where the first color filter array is formed, a lower substrate where a thin film transistor array is formed, and a liquid crystal layer formed between the upper substrate and the lower substrate.

* * * * *